United States Patent Office 3,474,061
Patented Oct. 21, 1969

3,474,061
CROSSLINKABLE POLYMER SYSTEM AND
PROCESS FOR THE PREPARATION THEREOF
Wulf von Bonin, Leverkusen, and Karl-Friedrich Zenner, Cologne-Flittard, Germany, assignors to Farbenfabriken Bayer Aktiengesellschaft, Leverkusen, Germany, a corporation of Germany
No Drawing. Filed Jan. 13, 1967, Ser. No. 608,988
Claims priority, application Germany, Jan. 15, 1966, F 48,179
Int. Cl. C08f 45/72
U.S. Cl. 260—29.6   10 Claims

ABSTRACT OF THE DISCLOSURE

A method for the preparation of a stable system suitable for treating textiles wherein a crosslinkable polymer which contains urethane, imide, amide, hydroxy, carboxy groups and groups capable of liberating those groups under crosslinking conditions is admixed with a crosslinker prepared by reacting an alkoxymethylisocyanate with a compound having at least two active hydrogen atoms.

---

This invention relates to a process for the treatment of textiles and textile fibers and, more particularly to a process for coating textiles with polymeric materials.

There are several prior art processes for the production of textile coatings from polymer latices containing amide, hydroxyl or carboxyl groups in combination with N-methylol compounds of low molecular weight amides such as, for example, of urea or melamine or their derivatives. These mixtures are applied to fibrous textile materials and crosslinked at elevated temperatures. Unfortunately, however, processes such as these have certain disadvantages.

For example, latices whose polymeric components contain large numbers of carboxyl groups in addition to the amide groups cannot be mixed with urea formaldehyde crosslinkers without causing the agglomeration or precipitation of latices which have been permitted to stand for a while under storage conditions. This is equally true for formaldehyde-melamine crosslinkers, and for this reason, such compounds can only be added to the latices directly before they are applied. Consequently, an additional unwanted process step or operation is required in order to obtain a workable composition. In addition, the properties of the textile substrates treated with these materials such as, for example, their resistance to degradation by boiling water and solvents, their resilience and hand, are not altogether satisfactory.

When methylol ethers of the aforementioned amide-like compounds are used, the unwanted effects referred to above can be reduced; however, they cannot be minimized or eliminated altogether. In addition, the methylol ethers described can only be obtained from the methylol amides by an additional reaction step and they are usually less reactive than the corresponding methylol amides so that the ultimate crosslinking stage requires comparatively higher temperatures and/or acid catalysis.

Further, only a relatively small number of crosslinkers such as, for example, those of the urea or melamine family which are readily available on an industrial scale are available for use as crosslinkers with the conventional methylol compounds. Consequently the properties of the crosslinking agent are only available to a very limited extent for the purpose of modifying the properties of the crosslinked polymer or the textile properties of the material being treated with it.

On the other hand solutions or aqueous dispersions of spontaneously crosslinking polymers have been proposed for finishing textiles. In such cases, the methylol or methylol ether groups are actually incorporated into the polymeric molecular structure and are obtained, for example, by the copolymerization of olefinically unsaturated monomers with N-methylol or N-methylol ether derivatives of polymerizable carboxylic acid amides. The resulting systems are single-component systems which are disadvantageous in that they often lack adequate storage stability. Because the polymeric molecules are of a considerable molecular weight, any reaction of the spontaneously crosslinking groups, no matter how minor, is generally sufficient to result in the premature formation of crosslinked and hence useless products. Spontaneously crosslinking polymers or copolymers in a single-component system are also disadvantageous for the reason that the polymerization temperature, the velocity of the polymerization, the molecular weight range and the pH range of the system must all be kept within narrow limits to insure that storage stable dispersions and/or solutions are formed which are free from any coagulation.

It is therefore an object of this invention to provide crosslinking polymer and copolymer compositions which are devoid of the foregoing disadvantages.

A further object of the invention is to provide storage stable polymer latices.

Another object of the invention is to provide a coating material for textiles which contains crosslinkable polymers or copolymers present in solution form or as an aqueous dispersion.

Still another object of the invention is to provide a substantially unlimited variety of crosslinking agents suitable for modifying the properties of textile materials such as their softness, their hydrophylic character, their elasticity, their polarity and hand, as well as their resistance to water and solvents.

Yet another object of the invention is to provide a crosslinked polymeric material particularly suitable for coating, strengthening, bonding and flocking fibrous textile materials.

The foregoing objects and others are accomplished in accordance with this invention, generally speaking, by providing a solution, dispersion or emulsion of a polymer or copolymer which is capable of undergoing a crosslinking reaction at elevated temperatures and alkyl ethers prepared by reacting a stoichiometric equivalent of an alkoxymethyl isocyanate having the formula

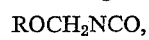

ROCH₂NCO, wherein R is a linear or branched aliphatic hydrocarbon radical having from about 1 to about 12 carbon atoms, with a compound containing at least two —OH groups reactive with —NCO groups.

The polymerica or copolymeric material which is capable of being crosslinked at an elevated temperature with the alkyl ethers mentioned above are present in either solution or latex form. Such crosslinkable polymers or copolymers contain at least about one percent by weight of at least one monomer containing at least one urethane and/or imide and/or amide and/or hydroxy and/or carboxy group and/or a group from which any one of the foregoing groups can be liberated under crosslinking reaction conditions such as the ammonium carboxylate, for example, carboxylate of ethanolamine or tributyl ammonium carboxylate or epoxide groups, for example, glycidester- or glycidether groups or mixtures thereof; polymers or copolymers containing carboxyl and/or amide and/or hydroxyl groups, particularly in admixture with one another, are preferred. These polymers may be prepared by any suitable known process such as for example, the solution or emulsion polymerization or copolymerization of olefinically unsaturated compounds having 2 to 6 C-atoms such as, for example, olefins including ethylene, propylene, isobutylene, butadiene, isoprene, methylpentene and the like; aromatic vinyl or vinylidene compounds such as, for example, styrene, a-methylstyrene, methylstyrene, and the like; vinyl halides including, for example, vinyl chloride, vinyl fluoride and the like; acrylic acid, methacrylic acid, derivatives of acrylic acid and methacrylic acids such as, for example, esters including acrylonitrile, methacrylonitrile, acrylamide, methacrylamide, glycidyl acrylate and glycidyl methacrylate and the like including the esters of acrylic acid or methacrylic acid prepared from alcohols which contain from about 1 to about 18 carbon atoms such as, for example, methylacrylate, ethylacrylate, isopropylacrylate, butylacrylate, isobutylacryate, 2-ethylhexylacrylate, dodecylacrylate, octodecylacrylate, ethylmethacrylate, methylmethacrylate, isopropylmethacrylate, 2-ethylhexylmethacrylate, isobutylmethacrylate, butylmethacrylate, octodecylmethacrylate, dodecylmethacrylate and the like; hydroxyalkyl esters of acrylic acid and/or methacrylic acid wherein the alkyl group contains from about 1 to 18 carbon atoms such as, for example, hydroxyethylacrylate, hydroxymethylacrylate, hydroxybutylacrylate, hydroxydodecylacrylate, hydroxyoctodecylacrylate, hydroxyisopropylacrylate, hydroxyethylmethacrylate, hydroxymethylmethacrylate, hydroxybutylmethacrylate, hydroxy - 2 - ethylhexylmethacrylate, hydroxyoctodecylmethacrylate, hydroxyisobutylmethacrylate, hydroxydodecylmethacrylate and the like; esters of vinyl alcohols wherein the ester group contains from about 1 to about 18 carbon atoms such as, for example, vinyl acetate, vinyl butyrate, vinyl propionate, vinyl hexoate, vinyl stearate and the like; allyl acetate, allyl propionate, allyl butyrate, allyl phthalate, allyl hexoate, allyl benzoate and the like; itaconic acid, maleic acid, fumaric acid, citraconic acid and the like and esters and diesters of itaconic acid, maleic acid, fumaric acid, citraconic acid and the like wherein the ester group has from about 1 to 18 carbon atoms such as, for example, the mono-ethyl, methyl, propyl, butyl, isopropyl, isobutyl, pentyl, hexyl, heptyl, octyl, dodecyl, stearyl and the like monoester of maleic acid, itaconic acid, fumaric acid, citraconic acid and the like and diesters of such acids such as, for example, diethyl maleate, dipropyl maleate, diisobutyl maleate, dipentyl maleate, diheptyl maleate, didodecyl maleate, dimethyl itaconate, dipropyl itaconate, dibutyl itaconate, diisohexyl itaconate, diheptyl itaconate, didodecyl itaconate, dimethyl fumarate, diethyl fumarate, diisopropyl fumarate, dipentyl fumarate, dihexyl fumarate, dimethyl citraconate, diethyl citraconate, dihexyl citraconate, dipropyl citraconate, diheptyl citraconate, didecyl citraconate, didodecyl citraconate, and the like, and mixtures of any and all of the foregoing compounds or general classes of compounds.

Said polymers or copolymers may be obtained, for example, according to USA patent specifications 2,556,075, 2,624,722, 2,724,707, 2,759,908, 2,759,910, 2,821,521, 2,934,524, 3,052,656, 3,240,740 and 3,274,141; German Auslegeschriften 1,102,410 and 1,037,128; French patent specification 1,463,245; Canadian patent specification 627,820.

It is to be understood that the foregoing listing is merely illustrative and is not intended to be limitative on the invention and that any and all olefinically unsaturated compounds may be used in the preparation of the polymers which are capable of undergoing crosslinking in accordance with this invention with the proviso that such polymer contain at least about one percent by weight of at least one monomer containing at least one of the groups mentioned hereinbefore which are active in carrying out the crosslinking reaction. Hence, the foregoing listing is merely representative of the countless compounds which are contemplated within the scope of the invention and which are operable therein.

The alkyl ethers which are capable of crosslinking the above described polymers and copolymers may be readily prepared by reacting a compound containing at least two —OH groups which are reactive with isocyanato groups with about a stoichiometric equivalent of an alkoxymethylisocyanate having the formula ROCH$_2$NCO wherein R is an aliphatic or substituted aliphatic hydrocarbon radical having from about 1 to about 12 carbon atoms. These reaction products may be either completely or partially soluble in water, and they should be capable of being dissolved in the water and/or organic phase of the system of this invention.

Some suitable compounds containing at least two hydroxyl groups reactive with isocyanate groups which may be used in the preparation of the alkyl ether crosslinking agent of this invention are, for example, polyhydric alcohols including 1,2-ethane diol, 1,2-propane diol, 1,3-propane diol, 1,4-butane diol, 1,3-butane diol, 2,3-butane diol, 2,2-dimethyl-1,3-propane diol, 2,3-dimethyl-2,3-butane diol, 1,5-pentane diol, 1,6-hexane diol, 2,5-hexane diol, 3-methyl-2,4-pentane diol, 3-methyl-5-ethyl-2,4-heptane diol, 1,8-octane diol, 1,12-octadecane diol, 2-butene-1,4-diol, 9,10-octadecene-1,12-diol, glycerol, 1,2,4-butane triol, 1,1,1-trimethylol ethane, 1,1,1-trimethylol propane, 1,2,6-hexane triol, polyvinyl alcohol and the like; polyethers such as, for example, the reaction product of any suitable alkylene oxide such as, for example, of from about 2 to about 150 mols preferably of 2 to 50 mols of ethylene oxide, propylene oxide, butylene oxide, amylene oxide, epihalohydrin such as epichlorohydrin and the like with any suitable initiator such as, for example, the polyhydric alcohols mentioned above; polyesters having terminal hydroxyl groups and molecular weights of up to about 5,000 but preferably between about 400 and about 2500 and prepared by reacting any suitable polyols such as those mentioned in the foregoing with any suitable difunctional or polyfunctional carboxylic acid such as, for example, adipic acid, maleic acid, phthalic acid, terephthalic acid, oxalic acid, malonic acid, succinic acid, glutaric acid, pimelic acid, azelaic acid, sebacic acid, fumari acid, glutaconic acid, terephthalic acid, trimellitic acid, mellophanic acid, benzenepentacarboxylic acid and the like and mixtures of any and all of the foregoing.

Any suitable alkoxymethylisocyanate including substituted alkoxymethylisocyanates may be used to react with any of the foregoing hydroxyl containing compounds to prepare the crosslinkers of this invention. Some such suitable isocyanates are, for example, methoxymethylisocyanate,
ethoxymethylisocyanate,
N-propoxymethylisocyanate,
isopropoxymethylisocyanate,
N-butoxymethylisocyanate,
isobutoxymethylisocyanate,
N-hexoxymethylisocyanate,
cyclohexoxymethylisocyanate,
dodecoxymethylisocyanate,
3-phenylpropoxymethylisocyanate,
2-chloroethoxymethylisocyanate,
4-chlorocyclohexoxymethylisocyanate,
5-naphthylpentoxymethylisocyanate,
5-bromocyclohexoxymethylisocyanate,
3-methylhexoxymethylisocyanate,
2-bromoethoxymethylisocyanate,
2-iodoethoxymethylisocyanate,
4-butyldecoxymethylisocyanate,
10-iodododecoxymethylisocyanate,
4-fluoro-N-butoxymethylisocyanate,
3-methyl-5-chloropentoxymethylisocyanate,
phenylmethoxymethylisocyanate,
4-phenylbutoxymethylisocyanate,
4-phenyl-N-hexoxymethylisocyanate,
4-phenylcyclohexoxymethylisocyanate,
4-chlorophenyl-3-propoxymethylisocyanate,
4-bromophenyl-3-propoxymethylisocyanate,
12-phenyldodecyl-6-chloro-4-bromododecoxmethylisocyanate and the like and mixtures thereof. Hence, any suitable substituted alkoxymethylisocyanate as well as any suitable unsubstituted alkoxymethylisocyanate may be used. Any suitable substituent may be present on the alkoxy group and some such suitable substitutents are, for example, aryl groups such as phenyl, naphthyl and the like, halogen such as chlorine, bromine, fluorine and iodide and the like, alkyl groups having from 1 to 12 carbon atoms such as methyl, ethyl, propyl, butyl, 2-methylpentyl, 2-ethylhexyl, octyl, dodecyl and the like and mixtures thereof. The alkoxymethylisocyanates may be obtained according to German patent specification 1,205,087.

Any suitable process may be used to react the appropriate polyol with the appropriate alkoxymethylisocyanate to prepare the alkyl ethers of this invention. For example, a stoichiometric equivalent of any suitable alkoxymethylisocyanate may be added dropwise to the appropriate polyol with which it is to be reacted and the mixture may be permitted to stand until the exothermic reaction has been completed. In such a case the reactants may be added to one another while dissolved in a suitable solvent such as any of those enumerated hereinafter, or else they may be added without the benefit of a solvent if they exist in a liquid form. For example, about 92 grams of glycerol to which about 261 grams of methoxymethylisocyanate are added dropwise with cooling, will yield about 353 grams of glycerol-tris-methoxy-methylurethane in the form of a colorless compound melting at about 60° to about 63° C. after the reaction mixture has been permitted to stand overnight.

In preparing the storage stable system of this invention which contains both the crosslinkable polymeric or copolymeric material and the crosslinking alkyl ethers of this invention, any suitable order of addition may be followed. Further, the crosslinkers which are in the form of a solution, dispersion or emulsion may be added to the polymers or copolymers to be crosslinked which may also be present in the form of a solution, emulsion or dispersion. The crosslinkers may be added to the polymers to be crosslinked before, during or following the preparation of the polymers and/or copolymers. Whether or not it is feasible or practical to add the crosslinker to the polymers and/or copolymers before, during or following their preparation depends upon the polymerization conditions under which they are fabricated, the reactivity of the alkyl ethers and the required storage stability of the end product to be formed. Generally, the most expedient alternative may be empirically determined according to the conditions involved in each individual case.

Any suitable solvent or dispersion or emulsion medium may be used to dissolve or disperse the crosslinker and/or the crosslinkable polymers and copolymers of this invention. Some such suitable solvents include water, any suitable organic solvent or solvent mixtures such as, for example, readily volatile alcohols, boiling at temperatures up to about 120° C. such as, for example, methanol, ethanol, propanol, butanol and the like; ketones such as, for example, diisobutyl ketone, pentanone-3, pentanone-2, cyclohexanone, 2,4-pentanedione, propanone, butanone, methylethyl ketone, acetone, dipropyl ketone, methylisobutyl ketone, methyltertiarylbutyl ketone and the like; esters such as, for example, ethyl acetate, propyl acetate, butyl acetate, amyl acetate, hexyl acetate and the like and preferably those esters of alcohols having up to about 6 carbon atoms and those acids having up to about 6 carbon atoms and including ethylpropionate, butylhexoate, amylpentoate, hexylbutyrate, propylpropionate and the like; dialkyl ethers such as, for example, methyl ether, ethyl ether, propyl ether, butyl ether, pentyl ether, hexyl ether, methylethyl ether, butylpentyl ether, hexylmethyl ether and the like; arylalkyl ethers such as, for example, benzylmethyl ether, methylxylyl ether, tolylethyl ether, benzylpropyl ether and the like; halohydrocarbons such as, for example, carbontetrachloride, trichloroethylene, chloroform, methylene chloride, bromobenzene, ethylene dichloride, ethylene bromide, chlorobenzene, dichlorobenzene, propylene dichloride, butyl chloride, and the like; aromatic hydrocarbons such as, for example, benzene, toluene, xylene, naphthalene and the like; aliphatic hydrocarbons such as, for example, methane, ethane, propane, butane, octane, hexane and the like; dimethyl formamide and the like and mixtures of any and all of the foregoing as well as isomers thereof.

Preferred are solvents or mixtures of solvents with boiling points between 30 and 140° C.

The crosslinkers being reaction products of alkoxymethylisocyanates and compound containing at least two active hydrogen atoms as determined by the Zerewitinoff method are used in amounts of 0.2 to 85% by weight preferably in amounts of 5 to 20% by weight, based on the crosslinkable polymer or copolymer.

The storage stable system thus prepared may then be applied to any suitable substrate such as, for example, a textile material, a wall, a floor, wooden paneling, any suitable plastic and the like and the crosslinking reaction may be carried out at a temperature in the range of from about 70° to about 200° C., and preferably at from about 80° to about 150° C. If desired, acids or acid doners may be used to facilitate the crosslinking reaction, although such expedients are not absolutely necessary. Some such suitable acid doners which may be used are, for example, ammonium salts of organic or inorganic acids such as ammonium maleate, ammonium chloride, ammonium phosphate, ammonium benzoate and the like as well as any of the acids upon which such compounds are based such as, for example, formic acid, acidic acid, maleic acid, toluene sulfonic acid and the like as well as inorganic acids including, for example, phosphoric acid, hydrochloric acid, sulfuric acid, perchloric acid and the like. The acids or acid doners are most advantageous when used in quantities of from about 0.01 to about 15% by weight based on the weight of the crosslinker used although any suitable concentration of the acid or acid doner may be used as desired.

Many of the advantages of the process of the instant invention are apparent from the foregoing discussion. For example, storage stable polymeric latices are readily obtained in the process of this invention because the crosslinking agent, although added to the latex of a polymer or copolymer which is capable of being crosslinked in a single solution or dispersion system, does not react and thereby become incorporated into the polymeric molecule which forms the latex but remains in the form of a comparatively low molecular weight compound in the system.

Another important advantage of the instant invention is the unique and almost limitless variety of crosslinking agents which can be used by virtue of the large number of polyols available to be incorporated into the composition of the instant invention. Because of the substantially limitless diversity of the crosslinking agents, it is possible to considerably modify the material properties of the final polymeric material to be prepared through the modifications of the polymeric or copolymeric structure itself. For example, the properties of the final product being formed such as the softness, hydrophilicity, elasticity, polarity and hand of the material being prepared as well as its behavior in water and solvents may be varied to any degree desired. Any one of the properties mentioned may be intensified or diminished either alone or in conjunction with any one or all of the other properties described depending on the crosslinker used. For example, the properties of the end product are substantially influenced by the type of polyol used as a starting material in the production of the crosslinking polymer, that is, whether the polyol is of a high molecular weight, low molecular weight, linear or branched, di-, tri- or polyfunctional nature, and also, by the quantity of the crosslinking polymer used. Specifically, the elasticity and softness of the crosslinked polymeric material being produced may be substantially increased by using linear diols having terminal hydroxyl groups and molecular weights in the range of from about 500 to about 5000. Further, the hydrophylic character, bond strength or abrasion resistance of the final crosslinked polymeric product to be produced can be modified by using strongly hydrophylic polyols such as, for example, polyethylene glycols, or strongly hydrophobic or polar polyols such as, for example, polyester polyols. Hence, the process of the instant invention is highly versatile and because of its versatility it is particularly advantageous in coating, strengthening, bonding and flocking fibrous textile materials.

The invention is further illustrated but is not intended to be limited by the following examples in which all parts and percentages are by weight unless otherwise specified.

linkers can even be added before or during the polymerization reaction.

An aqueous phase of the following composition (solution 1) is introduced into an autoclave equipped with a stirring mechanism: about 40,300 parts of water, about 134 parts of potassium persulphate, about 45 parts of sodium pyrosulphite and about 179 parts of paraffin slack wax sulphonate (Mersolat$^R$). Solution 1 is heated to about 45° C. in a nitrogen atmosphere, after which a solution of the following composition (solution 2) is pumped into it at a rate of about 6000 parts per hour: about 1420 parts of non-ionic emulsifier (ethoxylated phenol), about 1790 parts of 2-hydroxypropyl methacry-

| Crosslinker Number | Polyol | Alkylether isocyanate | Mols isocyanate: Mols polyol |
|---|---|---|---|
| 1 | 1,2-ethane diol | Methoxymethylisocyanate | 2:1 |
| 2 | 2-butene-1,4-diol | do | 2:1 |
| 3 | Polypropylene oxide (mol. weight 900) | do | 2:1 |
| 4 | Glycerol | do | 3:1 |
| 5 | 1,2,6-hexane triol | do | 3:1 |
| 6 | Tri-propoxylated trimethylolpropane | do | 3:1 |
| 7 | Pentaerythritol | do | 3:1 |
| 8 | do | do | 4:1 |
| 9 | Slightly branched polyester with terminal OH-groups, prepared from adipic acid, butane diol and a little glycerol (molecular weight about 950). | do | 3-4:1 |
| 10 | Branched co-polyester of phthalic acid, 1,2-propane diol and hexanetriol with terminal OH-groups (mol. wt. approx. 1,000). | do | 3-4:1 |
| 11 | Ethoxylation product of 1 mol of NH$_3$ and 18 mols of ethylene oxide. | do | 3:1 |
| 12 | Trimethylolpropane | Ethoxymethylisocyanate | 3:1 |
| 13 | do | i-Butoxymethylisocyanate | 3:1 |
| 14 | do | Cyclohexyloxymethylisocyanate | 3:1 |

EXAMPLE 1

The stability of the latices provided with the crosslinkers to be used in accordance with the invention is demontrated by this example.

Preparation of the latex:

About 1400 parts of water and about 80 parts of paraffin slack wax sulphonate (Mersolat$^R$) (solution 1) are introduced into an autoclave equipped with a stirring mechanism. Solution 1 is heated to about 45° C., after which about 2000 parts of water and about 60 parts of potassium persulphate (solution 2) are added to it. About another 2000 parts of water and about 20 parts of sodium pyrosulphite (solution 3) are then added. A solution of the following composition (solution 4) is then pumped in a rate of about 3000 parts per hour: about 640 parts of a non-ionic emulsifier (ethoxylated phenol), about 720 parts of acrylamide, about 300 parts of 2-hydroxypropyl methacrylate, about 80 parts of acrylic acid, about 1800 parts of acrylonitrile, about 4200 parts of ethyl acrylate and about 4900 parts of butyl acrylate.

Polymerization is continued at about 45° C. in a nitrogen atmosphere until a 100% conversion is achieved. A smooth latex of moderate viscosity is obtained.

If about 6% by weight of about a 50% by weight aqueous solution of hexamethylol melamine methyl ether or N-methylol urea methyl ether, are added to this latex, it thickens on storage for a few days at about 18° to about 30° C., and after two weeks forms a mass of sauce-like consistency which can no longer be stirred.

If the hexamethylol melamine compound is replaced by one of the crosslinkers listed in the table under Nos. 1, 4, 5 or 12, there are no signs of this effect, even after 3 months' storage under similar conditions.

The crosslinking itself is accomplished in the usual way by heating the textile material coated, bonded or lined with the latex at temperatures in the range of from about 120° to about 160° C.

EXAMPLE 2

Whereas Example 1 describes the application of the water-soluble crosslinkers by subsequently incorporating them into the latex, this example shows that the crosslate, about 1620 parts of acrylamide, about 2420 parts of acrylonitrile, about 9400 parts of ethyl acrylate and about 11,650 parts of butyl acrylate.

Polymerization is continued to completion at about 45° C. to yield a smooth latex. The latex can be converted into a storable system which crosslinks on heating to temperatures above about 80° C., by the subsequent addition of crosslinkers Nos. 4, 5 or 12, as in Example 1.

The crosslinker may also be added directly to the water phase (solution 1) at the outset. If about 1500 parts of crosslinkers Nos. 5, 7, 8 or 11 are added to the water phase of this example, a smooth storable latex is obtained without interfering with polymerization. The coatings prepared from the latex crosslink on heating to about 140° C. The addition of from about 0.5 to about 2% of ammonium maleate (based on the weight of the latex) increases the speed of crosslinking or lattice-like polymerization, and/or reduces the crosslinking temperature to from about 80° C. to about 120° C. The coatings are wash-resistant and are not affected by solvents.

EXAMPLE 3

This example illustrates the use of less soluble or non-water-soluble types of crosslinkers in accordance with the invention.

The latex is prepared as follows:

A solution of the following composition is introduced into an autoclave equipped with stirring mechanism and heated to about 45° C: about 1600 parts of water, about 300 parts of paraffin wax sulphonate, about 15 parts of sodium pyrosulphite and about 30 parts of potassium persulphate. The following solutions are then pumped in simultaneously so that they are uniformly metered; their addition is also terminated simultaneously. The different pumping rates are based on solution 3 which is pumped in at a rate of about 4000 parts per hour.

Solution 1: about 33,000 parts of water, about 600 parts of paraffin wax sulphonate, about 70 parts of potassium persulphate.

Solution 2: about 11,000 parts of water, about 35 parts of sodium pyrosulphite.

Solution 3: about 24,000 parts of butyl acrylate, about 3,900 parts of acrylonitrile, about 900 parts of acrylamide, about 1,200 parts of 2-hydroxypropyl methacrylate.

Polymerization is continued to completion at about 45° C. in a nitrogen atmosphere to yield a smooth latex. If about 5% of a mixture of about 80 parts of crosslinker No. 6 and about 20 parts of non-ionic emulsifier (ethoxylated phenol) are stirred into this latex, a storable system is obtained. Adhesive compositions, linings or coatings for textile materials which crosslink on heating at about 120° to about 160° C. can be prepared from this storable system. The addition of about 0.5% of ammonium phosphate increases the crosslinking velocity. In another embodiment, about 3.5% of either of crosslinkers Nos. 13 or 2 are stirred into the latex heated to about 45° C. The mixture is then cooled, after which the latex may be used in a similar fashion.

In another embodiment, about 10% of about a 40% solution of crosslinker No. 14 in ethylene glycol monomethyl ether acetate is stirred into the latex. In this case, a system of higher viscosity is obtained because the latex particles swell to some extent. Viscous latices of this kind with crosslinking properties are particularly suitable for quilting textiles.

EXAMPLE 4

This example illustrates the invention wherein water-insoluble crosslinkers are added before or during polymerization.

A latex is prepared as in Example 3 except that about 1000 parts of crosslinkers Nos. 3, 9 or 10 are additionally added to the solution. In every case, the polymerization proceeds without difficulty to yield smooth latices. Crosslinked products with a softer textile hand are obtained as compared with the results obtained in Example 3, because crosslinkers No. 3 or 9 incorporated therein by the crosslinking process, act as additional plasticizers.

By contrast, crosslinker No. 10 produces a somewhat harder hand because the basic polyester itself is a resinous material. These factors influencing textile hand can be further intensified by increasing the quantity of crosslinker added.

EXAMPLE 5

A latex is prepared as in Example 3, except that about 1100 parts of crosslinker No. 6 are additionally added to solution 3. The latex is then precipitated with a solution of sodium chloride and thoroughly washed; the polymer is then dried and can be rolled onto textiles. The polymer crosslinks on heating at about 140° to about 190° C., yielding solvent-resistant coatings and bonds.

EXAMPLE 6

A copolymer of about 25% by weight of acrylic acid, about 50% by weight of ethyl acrylate, about 15% by weight of 2-hydroxypropylmethacrylate and about 10% by weight of acrylonitrile, is dissolved in about 8% by weight of aqueous ammonia to give about a 25% by weight solution. About 100 parts of this solution are stirred with about 6 parts of crosslinker No. 5 and used to impregnate a fleece. After the impregnated material is pre-dried, it is heated to about 140° C. to yield a hardened fleece which substantially retains its properties in water and ethyl acetate, and may be used as a structural material.

EXAMPLE 7

About a 30% aqueous ammoniacal solution of an alternately synthesized polymer of styrene and monomethyl maleate is mixed with about 8% of crosslinker No. 11. Fleece impregnated with this solution crosslinks at a temperature of from about 140° C. to about 160° C. to form sheets or panels exhibiting a high resistance to both water and solvents.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A method for the preparation of a stable system capable of undergoing crosslinking which comprises admixing a crosslinkable polymer with a crosslinker wherein the crosslinkable polymer is a polymer prepared from olefinically unsaturated monomers and contains at least about one percent by weight of at least one monomer containing at least one member selected from the group consisting of urethane, imide, amide, hydroxy and carboxy and the crosslinker is the reaction product of a stoichiometric equivalent of an alkoxymethylisocyanate having the formula $ROCH_2NCO$, wherein R is an aliphatic hydrocarbon radical having from about 1 to about 12 carbon atoms with a compound containing at least two hydroxy groups reactive with —NCO groups, said system being in the form of a solution, dispersion or emulsion.

2. The method of claim 1 wherein the system is heated to from about 70° C. to about 200° C. to initiate the crosslinking reaction.

3. The process of claim 1 wherein the crosslinking reaction is catalyzed with a catalytic amount of an acid or acid donor.

4. The process of claim 1 wherein a solution, emulsion or dispersion of the crosslinker is aded to a solution, emulsion or dispersion of the crosslinkable polymer.

5. The product of the process of claim 1.

6. The process of claim 1 wherein the crosslinker is added to the system before the crosslinkable polymer is prepared in the system.

7. The process of claim 1 wherein the crosslinker is added to the system during the preparation of the crosslinkable polymer in the system.

8. The process of claim 1 wherein the system of the crosslinkable polymer and the crosslinker is coated onto a textile and heated to initiate the crosslinking reaction.

9. The product of the process of claim 8.

10. The process of claim 1 wherein the system is a water dispersion.

References Cited

UNITED STATES PATENTS

| 2,340,757 | 2/1944 | Kaase et al. | 260—453 |
| 2,466,404 | 4/1949 | Fowler et al. | 260—77.5 |
| 2,592,263 | 4/1952 | Frame | 260—117 |
| 2,626,278 | 1/1953 | Wystrach et al. | 260—453 |
| 3,205,284 | 9/1965 | McCulloch | 260—858 |

FOREIGN PATENTS

| 1,337,602 | 8/1963 | France. |
| 918,777 | 10/1954 | Germany. |
| 1,205,087 | 11/1965 | Germany. |
| 1,034,693 | 6/1966 | Great Britain. |

MURRAY TILLMAN, Primary Examiner

W. J. BRIGGS, Sr., Assistant Examiner

U.S. Cl. X.R.

117—139.5, 140; 260—31.2, 32.6, 32.8, 33.2, 33.4, 33.6, 33.8, 75, 73, 77.5, 78.4, 78.5, 80.3, 80, 80.73, 70.75, 80.8, 80.81, 83.5, 86.1, 89.1, 89.7, 91.3